US009221355B2

(12) United States Patent
Kuhn et al.

(10) Patent No.: US 9,221,355 B2
(45) Date of Patent: Dec. 29, 2015

(54) METHOD FOR DISPLAYING THE OPERATING RANGE OF AN ELECTRIC DRIVE VEHICLE, AND DISPLAY

(75) Inventors: Thomas Kuhn, Regenstauf (DE); Herbert Meier, Regensburg (DE); Nhu Nguyen Thien, Regensburg (DE); Alexander Stege, Rohrbach (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/126,316

(22) PCT Filed: Jun. 11, 2012

(86) PCT No.: PCT/EP2012/060974
§ 371 (c)(1),
(2), (4) Date: Feb. 12, 2014

(87) PCT Pub. No.: WO2012/171865
PCT Pub. Date: Dec. 20, 2012

(65) Prior Publication Data
US 2014/0172285 A1    Jun. 19, 2014

(30) Foreign Application Priority Data

Jun. 14, 2011   (DE) .......................... 10 2011 104 153

(51) Int. Cl.
*B60W 20/00* (2006.01)
*G01C 21/34* (2006.01)
*B60L 11/18* (2006.01)

(52) U.S. Cl.
CPC ......... *B60L 11/1861* (2013.01); *G01C 21/3469* (2013.01); *B60L 2240/12* (2013.01);
(Continued)

(58) Field of Classification Search
CPC ... B60W 20/00; B60W 10/08; B60W 20/104; B60W 20/50
USPC ........... 701/22, 23, 26, 123, 533; 340/995.27; 180/65.21, 65.265
See application file for complete search history.

(56) References Cited

U.S. PATENT DOCUMENTS 5,539,399 A * 7/1996 Takahira et al. ......... 340/995.27
5,790,976 A    8/1998 Boll et al.
(Continued)

FOREIGN PATENT DOCUMENTS

DE    195 19 107    4/1996
DE    197 41 316    3/1999
(Continued)

*Primary Examiner* — Thomas Tarcza
*Assistant Examiner* — Tyler J Lee
(74) *Attorney, Agent, or Firm* — Cozen O'Connor (57) ABSTRACT

A method and display for displaying the operating range of an electric drive vehicle and a display for carrying out same are provided. The battery energy in a vehicle is detected, and a maximum operating range of the vehicle is determined therefrom. At least one battery service station is selected as destination point for determining the maximum operating range. Based on a starting point, a reachability threshold is determined. If exceeded, the vehicle will be unable to reach the destination point with the current battery energy available, wherein said reachability threshold is displayed as an operating range in a map illustration. During the determination of the reachability threshold, the current location is used as the starting point and the current battery energy of the vehicle is used, both of which are updated at pre-defined intervals while the vehicle is moving.

12 Claims, 4 Drawing Sheets (52) U.S. Cl.
CPC .......... *B60L2240/18* (2013.01); *B60L 2240/20* (2013.01); *B60L 2240/461* (2013.01); *B60L 2240/622* (2013.01); *B60L 2240/642* (2013.01); *B60L 2250/16* (2013.01); *B60L 2260/52* (2013.01); *B60W 20/104* (2013.01); *Y02T 10/7005* (2013.01); *Y02T 10/705* (2013.01); *Y02T 10/7044* (2013.01); *Y02T 10/7291* (2013.01); *Y02T 90/16* (2013.01); *Y02T 90/161* (2013.01); *Y02T 90/162* (2013.01)

(56) References Cited

U.S. PATENT DOCUMENTS

| | | | |
|---|---|---|---|
| 5,815,824 A | 9/1998 | Saga et al. | |
| 6,814,170 B2 | 11/2004 | Abe et al. | |
| 6,864,807 B2 * | 3/2005 | Todoriki et al. | 340/988 |
| 8,294,420 B2 * | 10/2012 | Kocher | 320/109 |
| 2009/0114463 A1 * | 5/2009 | DeVault | 180/65.29 |
| 2009/0182463 A1 * | 7/2009 | Maguire et al. | 701/22 |
| 2010/0094496 A1 | 4/2010 | Hershkovitz et al. | |
| 2010/0241301 A1 * | 9/2010 | Yang | 701/29 |
| 2011/0224852 A1 * | 9/2011 | Profitt-Brown et al. | 701/22 |
| 2012/0109515 A1 * | 5/2012 | Uyeki et al. | 701/423 |
| 2012/0109519 A1 * | 5/2012 | Uyeki | 701/439 |
| 2012/0136574 A1 | 5/2012 | Kobayashi et al. | |

FOREIGN PATENT DOCUMENTS

| | | |
|---|---|---|
| DE | 103 02 504 | 9/2004 |
| EP | 1 275 936 A2 | 1/2003 |
| EP | 2 172 740 A1 | 4/2010 |
| JP | 2003-294463 A | 10/2003 |
| JP | 2006-112932 | 4/2006 |
| WO | WO 2010/137307 A1 | 12/2010 |

* cited by examiner

METHOD FOR DISPLAYING THE OPERATING RANGE OF AN ELECTRIC DRIVE VEHICLE, AND DISPLAY

CROSS-REFERENCE TO RELATED APPLICATIONS

This is a U.S. national stage of application No. PCT/EP2012/060974, filed on 11 Jun. 2012, which claims priority to the German Application No. 10 2011 104 153.6, filed 14 Jun. 2011, the content of both incorporated herein by reference.

BACKGROUND OF THE INVENTION

1. Field of the Invention

The invention relates to a method for displaying the operating range of an electric drive vehicle and to a corresponding display device which, in particular, is configured for carrying out the method by a computer program product according to the invention. In the method, the battery energy currently available in a vehicle is determined and from this a maximum operating range of the vehicle is derived. The battery is typically constructed in the form of an accumulator and delivers the electrical energy for the electric drive. For determining the maximum operating range, at least one battery service station is selected as a destination point in the method, i.e., a station at which charging or replacing a battery is possible, especially a home position in the sense of a private battery service station (at home, work or the like) or a power filling station in the sense of a public battery service station. Using a starting point as a basis, an accessibility threshold is then determined, in the case of the transgression of which the vehicle can no longer reach the destination point with the current battery energy and/or can no longer return to the starting point (as destination point). This accessibility threshold is also called the "point of no return". The accessibility threshold is displayed as an operating range in a map illustration. The map illustration can consist, for example, of a digital map, a stylized map having some selected position information items, or, in the simplest case, of a map containing only one scale.

2. Related Art

In principle, it is a problem in the case of electric drive vehicles that the operating range, which is distinctly restricted compared with fuel-operated vehicles, entails distinct losses of flexibility for the driver in his route planning and reaching the desired destinations. To increase the acceptance of electric vehicles, it is necessary, therefore, to at least keep the driver well informed about the destinations which can still be reached by him.

For this purpose, displays are known in which a circle in a map illustration is used, the radius of which, starting from the center point of the circle as current location, specifies the limits of the area which can be reached in the case of a direct, i.e. radial route. Although the driver can then see whether he can still reach his destination on a direct route, the driver will not know exactly, however, when an intermediate destination is not located precisely on this radial route, whether he can still approach such an intermediate destination. Taking into consideration that a vehicle also may need to charge or exchange the battery in a battery service station at its final destination, the final destination will frequently not be the actual useful destination of the trip because of the possibility that charging or exchanging the battery might not always be available at the useful destination. The useful destination then actually represents the intermediate destination and the battery service station represents the actual final destination.

From U.S. Pat. No. 5,539,399 A, a display is known in which the operating range of an electric drive vehicle can be displayed on a road map in dependence on the current battery charge. This can be done in a simple manner by a circle around the current location or by marking the accessible sections of all routes which can be traveled from the current location. To increase the accuracy, topographic data of the individual roads or regions are taken into consideration in the calculation of the maximum operating range, which are also stored in a digital road map. The problem of intermediate destinations, described above, is not taken into consideration in this context so that it is left to the driver to evaluate whether, after an intermediate destination, he will still be able to reach the final destination at which the battery of the vehicle can be exchanged or charged.

US 2010/0094496 A1 discloses a display of the threshold of the maximum operating range and of a "point of no return" threshold, in the case of the transgression of which a return to a reference point is no longer possible with the current energy supply without charging or exchanging the battery. The reference point can be the home of the car user or a charging station. In the determination of the accessibility of a destination, it is initially determined whether a vehicle can reach the destination with the amount of charge currently present in the battery. If this is not possible, it is checked whether the vehicle can reach a battery service station, which is then added to an energy plan, it also being possible, if necessary, for a charging time at this station to also be taken into consideration. The display occurs in the context of route planning. A warning message is generated if the driver exceeds a "point of no return" threshold, i.e. can no longer reach a battery service station with the energy remaining in the battery. This is cumbersome in that the routes need to be planned elaborately and the next destinations must always be input or confirmed by the user. This is elaborate and complicated in the case of spontaneous route changes. Moreover, it is always necessary to wait for the updating of the route planning until the driver is able to decide whether he can actually drive the planned route.

EP 2 172 740 A1 discloses a method for displaying the operating range of an electric drive vehicle in dependence on a charging time of the battery and the location, the operating range being displayed in dependence on various charging periods starting with the current state of charge of the battery. At the same time, the road geometry, slope information, traffic information and/or information from a learning system can also be used. Although this makes it easier for the user, before starting the journey, to estimate the amount of energy needed for the next trip as charging time of the system relevant for him, the user must also ensure in this system that he can also still continue driving to a charging or exchanging station after reaching the desired destination.

From JP-A-2006-112932, a similar method is known in which a navigation device allows the user of an electrically operated vehicle to input a desired destination in order then to determine the arrival time, wherein, apart from the traveling time, the required amount of energy and possibly the time needed for charging the battery is also taken into consideration if the energy available in the battery is not sufficient for reaching the destination.

JP-A-2003-294463 describes an input or display and selection of charging stations in the vicinity of a desired destination for the purpose of calculating whether it is possible to continue driving as far as a charging station after reaching a destination. However, this does always require a destination to be input, which restricts the flexibility in utilization.

Because there must always be a system-supported route planning, this hinders spontaneous route changes of the driver.

SUMMARY OF THE INVENTION

It is the object of the invention to propose a method for displaying the operating range of an electric drive vehicle which offers the driver an interactive system for clearly laid out and dynamic operating range planning.

This object is achieved by a the proposed method, in which it is provided, in particular, that in the determination of the accessibility threshold, the current location is in each case used as starting point, and the current battery energy, i.e. the currently determined battery energy, of the vehicle is used, these being updated at predeterminable intervals while the vehicle is traveling.

In contrast to the methods known from the prior art, according to aspects of the present invention, the user does not need to predetermine a fixed route destination for utilizing the display for planning the operating range but instead receives a display of the current operating range based on his current location determined during the trip and the current state of battery charge determined during the trip, a battery service station being selected in each case as necessary destination point for determining the possible operating range without the driver having to make a special input for this purpose. This applies especially when the driver is moving in a known environment and, after concluding his trips, returns back to the starting position. To this extent, the home position can be predetermined, for example, as destination point. Starting from this position, the driver obtains dynamic control without the necessity for separately setting the destination or for modified input in the case of the desire to change the planned traveling route. As a result, the proposed display is especially user-friendly and can be adapted flexibly to the respective location of the vehicle.

In one aspect, the driver can, for example, input a destination once, which is then used time and again during the performance of the method according to the invention until the driver selects a different destination. No further inputs are then necessary for performing the method and displaying the operating range of the vehicle for a multiplicity of applications, for example trips between work and the home location and trips around the home location.

In order to reduce necessary user inputs further, it can be provided, according to an aspect of the invention, that the destination point is automatically selected in accordance with predetermined criteria, wherein, when certain criteria are present, a manual selection and/or a confirmation of the destination point by the driver can also be activated automatically, for example by predetermining a suitable selection mask in a menu structure for user interaction. In the menu structure, various menu sequences can be provided for providing for a menu selection or confirming an automatically selected destination. These menu points can be implemented as a menu destination point confirmation and a menu destination point input, it being possible to change from one into the other menu structure depending on input. The criteria for the automatic selection of a destination point can be varied. Thus, it may be proposed, for example, that in each case the last battery service or charging station is the current location (if a battery charge has taken place there and/or takes place there more frequently), or a home position predetermined by the user, the home position preferably being selected when, with reference to the operating range possible with the current battery charge, this is sufficiently close to the current location as starting point. Sufficiently close can be defined in this context as meaning that the home station can still be reached or that it can still be reached with a particular proportion of the energy available overall, for example 25%, 50% or 75%, in order to also provide for detours and intermediate destinations.

In general, it can be proposed, according to an aspect of the invention, to make the selection of the destination point dependent on the distance—starting from the current location to possible predetermined destination points, wherein, if necessary, a particular ranking of destinations is taken into consideration. Furthermore, it may be configurable in the context of the selection of the destination point which destination points can be selected automatically and which destination points can only be selected after confirmation as new destination points.

A particularly advantageous and flexible variant of the method proposed according to the invention provides that the destination point is updated also during the performance of the method, i.e. also in the case of a movement of the vehicle during the trip. Updating can take place whenever the vehicle reaches the accessibility threshold with reference to the currently selected destination point, this being able to take place in graded manner with prior warning message if the vehicle approaches the accessibility threshold up to, for example, a particular percentage.

To show the driver clearly, in the display, which operating range he would have in the case of a change of the destination point, according to an aspect of the invention a number of different destination points is selected during the performance of the method and the operating range is displayed as combined operating range, possibly in a different representation for the preferred and/or currently selected destination, for example the home position, the charging station used most frequently, a normal battery service station depending on the time of day, such as, for example, the home position on work days in the evening and at night, and the work position during the day, for destinations that are usual due to a typical driving behavior, i.e. especially with this driving behavior the battery service stations usually visited, and for merely possible battery service stations without there being a particular preference for these. The possible battery service stations can be, for example, public power filling stations. The differently preferred destination points can be identified differently, for example, by different color areas or other representation.

According to an aspect of the invention, in the present method, the display of the operating range, preferably in a more or less detailed or abstract map illustration takes place by presentation of the currently selected destination point or the currently selected and further possible destination points and the starting point, i.e. the current location, updated at predetermined intervals, as current starting point and an area surrounding these, the boundary of this area being defined by the operating range from the starting point to the destination point. The threshold of the area is thus defined by the fact that, from the starting point, this limit can be reached and from the boundary the destination point can still be reached in a further trip without the battery of the vehicle first having to be charged. The boundary of this area thus specifies the accessibility threshold, in the case of the transgression of which an approach to the selected destination point is no longer possible from the current starting point or location. Each point outside the accessibility threshold is thus a "point of no return".

The representation of the destination point has the advantage that the driver recognizes this destination point on first looking at the map illustration even with an automatically selected destination point and can change it, if necessary, via a user interface.

The current location can be updated preferably via a known position-finding system, especially a satellite position-finding system such as GPS, Galileo or the like. By taking into consideration the current energy supply, the display is continuously and dynamically updated so that the driver has the ability, for example also by changing his driving behavior, to increase the current operating range while still reaching the destination point.

In the representation described above, the length from the starting point to a point of the accessibility threshold and the length from this point on the accessibility threshold to the destination point together just result in the maximum operating range accessible with the energy supply. If start and destination point coincide, for example on starting a trip from the home position, the accessibility threshold is symbolized by a circle.

According to an aspect of the invention, however, the operating range is generally preferably presented by an ellipse, the destination point and the starting point being shown as focal points of the ellipse and the edge of the ellipse being defined by the total length of the group of connecting lines, corresponding to the current operating range, from one focal point to a point on the edge of the ellipse (accessibility threshold) and from this point on the edge of the ellipse to the other focal point. Even if the actual operating range, which also depends on the type of available loads, the topology etc., is not reproduced precisely by an ellipse shape in practice, a simple and clear dynamic map illustration can be achieved by this elliptical representation, and a certain safety margin can be included in the calculation when determining the operating range threshold. The ellipse becomes narrower with decreasing energy reserve until it becomes compressed to form a line. In this case, only the destination point would be accessible directly from the current location and no intermediate destination not located on this line.

According to another aspect of the invention, a number of destination points can also be considered in the proposed method wherein, when considering a number of destination points, for each destination point, taking into consideration the respectively current starting point (current location of the vehicle), the respective accessibility threshold is determined and shown as an accessibility threshold combined for all destination points in the sense of a total accessibility threshold enveloping all accessibility thresholds. Within this total accessibility threshold, the boundary lines of the individual accessibility thresholds no longer need be represented. Preferably, however, the area that can be reached without a change of destination point should be represented in an emphasized manner. This can be done by different coloring or simply by a continuous boundary line—in this case in the interior of the total accessibility threshold. If necessary, the boundary lines can also be represented in an overlap area adjoining the edge area in order to illustrate the association of certain accessibility thresholds with the various destination points.

For the further improvement of the method proposed according to an aspect of the invention, it is possible to take into consideration in the determination of the maximum operating range additional information about the driving technique (for example average power consumption over one or more past periods), vehicle power consumption management, especially relating to loads switched on and/or information about the topology in the environment around the vehicle, for example from map information of a stored digital map. This information does not necessarily have to be road related but can also be determined from a classification of certain environmental areas in the topology and average power consumptions fitting the classification. In contrast to a road-related evaluation, this has the advantage that the method according to the invention provides accuracy even without the activation of precise guidance to a destination which, according to the invention, is to be avoided. Additionally, it can also be provided as part of the method proposed according to the invention that, if necessary, certain typical power consumptions are determined in a self-learning manner for roads traveled on repeatedly. If necessary, this can be done by a sliding averaging technique or, for example, one weighted with the number of trips on this route.

For further detailing of the information used for the operating range determination, vehicle sensors can also be used in the determination of the maximum operating range, wherein preferably especially those sensors are used which are already installed by other system components present in the vehicle. Such sensors can be, for example, angle transducers, wheel sensors, speed sensors, acceleration sensors, slope sensors, height sensors or the like. In particular, sensors that are also used as part of a compound navigation in which it is possible to infer the route traveled and/or the route profile traveled from sensor information are appropriate for the present method. According to an aspect of the invention, it is thus possible to determine the energy consumption of routes traveled on even without position-finding or navigation systems, if necessary even together with topology information and/or an additional classification of this topology which, naturally, can also be derived from the information contained in position-finding systems and digital maps. In this manner, energy consumption prediction to the destination point can be improved by assuming similar adjacent topologies in comparison with the topology just traveled through and a good prediction can be achieved when returning to the starting point because the starting point at the beginning of the trip is associated with the destination point, and in this case the topology is known. According to the invention, it can be taken into consideration here that the direction of travel is now reversed and, for example, an uphill gradient becomes a downhill gradient. This can be correspondingly recalculated in the energy prognosis.

Furthermore, an aspect of the present invention relates to a display device comprising a display for displaying the operating range of an electric drive vehicle, a computing unit with data memory, a user interface and a sensor unit for determining the position of the vehicle, the display, the user interface and the sensor unit being connected or connectable to the computing unit, for example via a vehicle bus via which various modules are in a communication link with the display, the user interface, the computing unit and the sensor unit (EN) with one another. According to an aspect of the invention, the computing unit allocated to the display device is configured for performing the method described above or parts thereof.

The sensor unit of the display device according to an aspect of the invention can preferably have an angle transducer, a wheel sensor, a speed sensor, an acceleration sensor, an inclination sensor, a height sensor and/or a position-finding sensor. Suitable sensors can also be integrated in a so-called IMU (Intertial Measurement Unit) for stabilizing the vehicle.

Finally, according to an aspect of the present invention, a non-transitory computer-readable medium stores program code for configuring a display device, especially the display device described above, to display the operating range of an electric drive vehicle, the program code being suitable, when executed by a computing unit, for configuring the computing unit to carry out the method described above or parts thereof.

BRIEF DESCRIPTION OF THE DRAWINGS

Further advantages, features and possible applications of the present invention are also found in the subsequent description of exemplary embodiments, and the drawings. In this context, all features described and/or represented pictorially by themselves or in arbitrary combination form the subject matter of the present invention, also independently of their combination in the claims or their references.

In the drawings:

FIG. 6 shows a possible display of the accessibility on a display with the selection of a number of destination points and FIG. 7 shows a display device according to an embodiment according to the invention.

DETAILED DESCRIPTION OF THE PRESENTLY PREFERRED EMBODIMENTS

Figure 1:
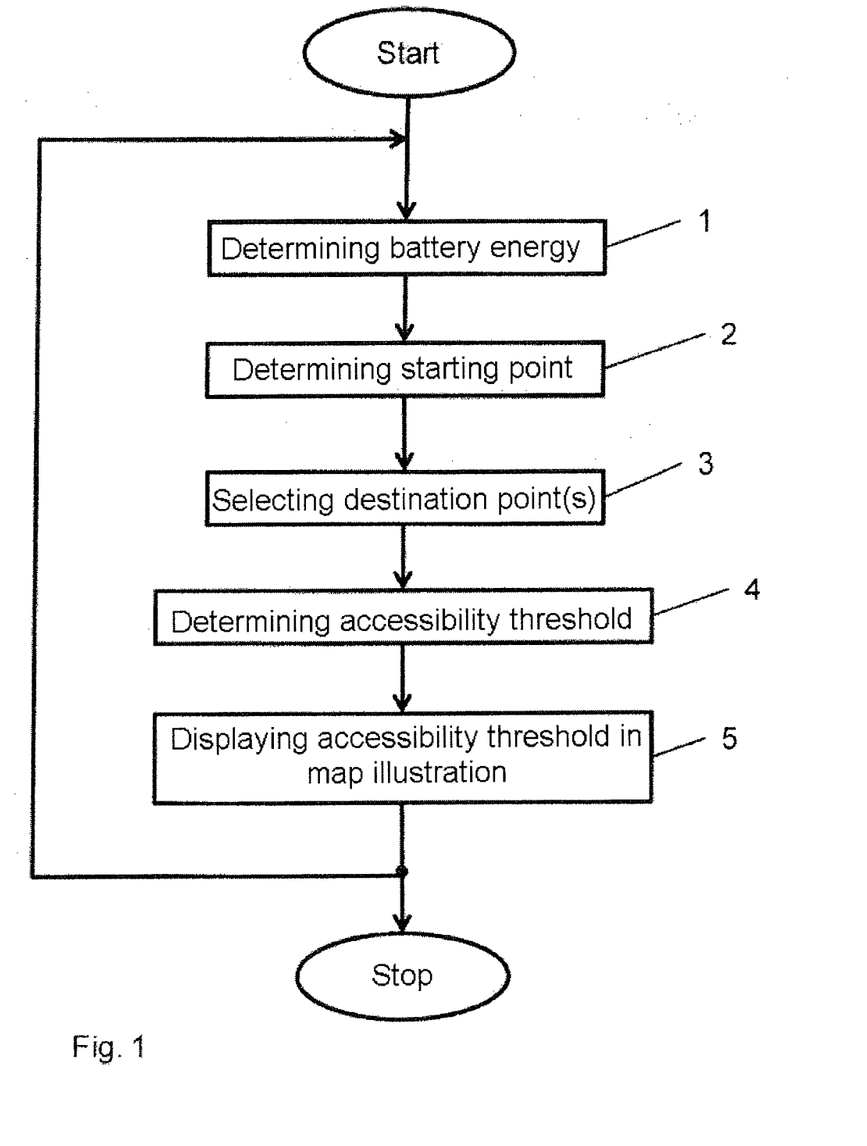
FIG. 1 is a flowchart that shows diagrammatically the sequence of an embodiment of the method according to the invention.

According to an exemplary embodiment, after the method has been started, a determination of the currently available battery energy takes place in step 1 in the flowchart shown in FIG. 1. This can take place by interrogating an energy management unit provided in the vehicle that continuously monitors the battery charge and displays it, for example, on a display in the cockpit of the vehicle. This status display can also be used for the purposes according to the invention.

In step 2, the starting point is determined, from which the operating range is to be represented. According to the embodiment, this is, in particular, the respective current starting point of the vehicle, which can be determined preferably by a corresponding position-finding system, for example by satellite positioning. Alternatively, the starting point from which the operating range is to be represented can also be determined via compound navigation and the corresponding sensor information starting from a known current location.

In step 3, the selection of a destination point or, if necessary, a number of destination points takes place, the (all) destination points being battery service stations, according to the embodiment, in which the battery of the vehicle can be recharged or exchanged. Destination points to be considered are thus, in particular, a home position (home, work or the like) in which the possibility exists, at least for the driver privately, to charge the battery of his vehicle. These destination points are input by the driver during the configuration of the system, i.e. in the computer program provided for this purpose. Alternatively or additionally, it can be determined in self-learning manner during the performance of the method, which positions are considered as destination points in that the method learns the positions at which charging or an exchange of the battery has taken place. Furthermore, public battery service stations can be determined, for example from digital map information. The selection of the destination points can take place automatically, by input via a user interface or in a combined method as will be explained later in greater detail with reference to FIG. 2.

In step 4, the accessibility threshold is determined on the basis of the previously determined and selected information, i.e. the area which can be reached from the starting point, in which context a return of the vehicle to the destination point must also be possible in each case from the accessibility threshold. For this purpose, an attainable distance is determined or estimated on the basis of a typical average power consumption per kilometer and the available battery energy in the context of the method wherein the determination can be composed more precisely by using detailed information.

Thus, the average power consumption can be determined immediately at delivery of the vehicle or after a system reset due to a lack of empirically determined data, firstly on the basis of typical average consumption values of the manufacturer. After a certain running time of the vehicle, these can be supplemented or replaced by a long-term average measured, and thus adapted to the typical utilization of the vehicle. Apart from this long-term average, it is also appropriate to use an average over a shorter period, for example from the beginning of the trip and/or the last trip, since this automatically takes into consideration the currently typical environment (city, countryside, freeway), the terrain topology (flat, hilly, mountainous) and external influences (temperature). For this purpose, the route traveled can be calculated from speed and time sensors and the battery consumption can be added up from the battery management of the vehicle. From this information, the average consumption can be calculated for various time intervals, and thus the possible remaining range. As soon as the remaining range becomes less than the route traveled, minus a margin of tolerance, a "point of no return" is reached, in the case of the transgression of which the vehicle can no longer return to the starting point. Depending on the direction of travel and the position of the destination point relative to the starting point, a map illustration would produce a range area which includes the starting point and the destination point and the boundary of which marks a line, the transgression of which no longer enables a vehicle to continue to the predetermined or current destination point.

The accessibility threshold or the area of accessible range is subsequently displayed in step 5. As long as the vehicle is moving, the method described above is repeated in predeterminable or predetermined time and/or distance intervals so that, dynamically related to the respectively current location of the vehicle, the operating range and the possibility of return to the destination point can be seen by the driver without the driver having to perform an elaborate route guidance in a navigation device.

The selection of one or more destination points according to the method does not in this context represent any route guidance in the actual sense because such a destination point frequently does not have to be selected for every trip but retains validity, for example in the case of similar utilization behavior of the vehicle in a limited spatial area and/or can be selected automatically by the proposed method. This is because the destination point is not the actual (subjective) useful destination of the trip but a battery service station at which the vehicle battery can be charged up.

Figure 2:
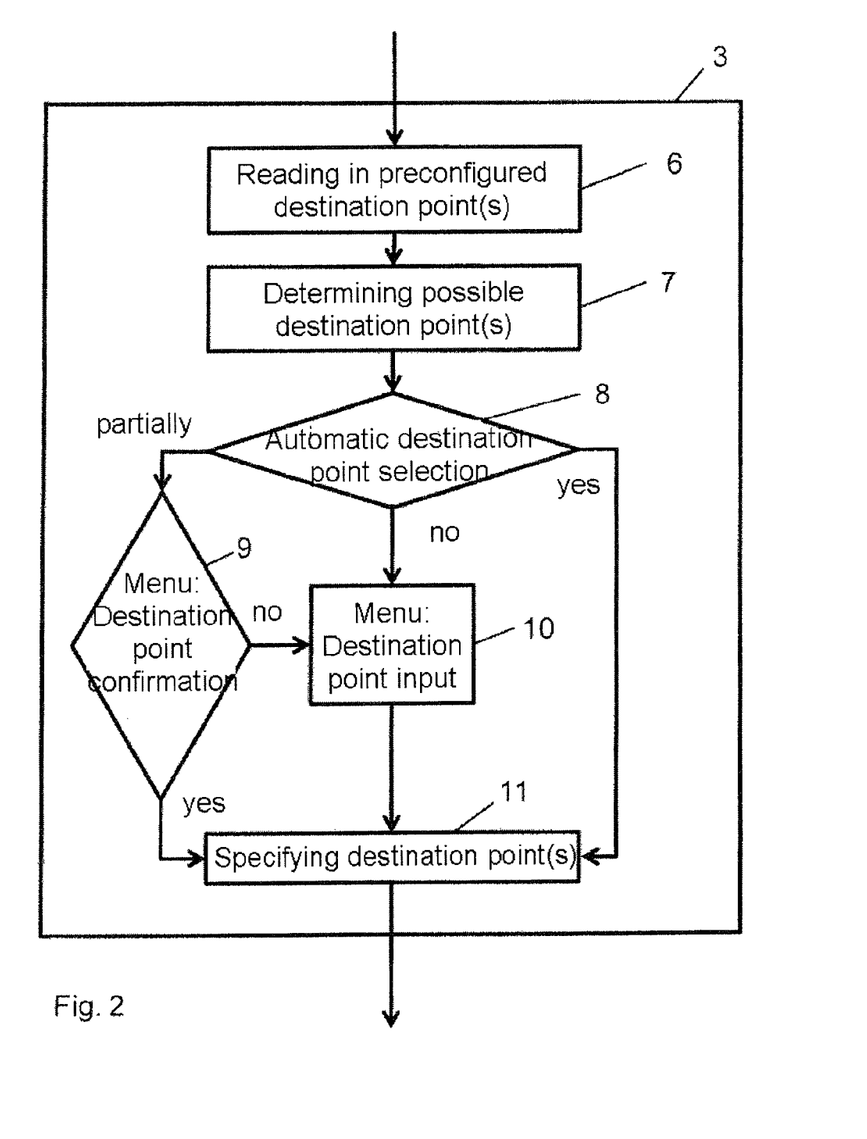
FIG. 2 is a flow chart for the selection of destination points according to FIG. 1.

A particularly advantageous method for selecting the destination point shall be explained in greater detail in the text which follows, referring to FIG. 2, which relates to step 3 of FIG. 1 for selecting the destination point or a number of destination points. As part of the selection of destination point, preconfigured destination points are first read in which are preferably preferred destination points predetermined by the user. These can be especially a home position, such as the home or workplace. Preconfigured destination points can, however, also be destination points, self-learnt by the system, which have been frequently driven to by the driver in the past, where the battery has been charged up or exchanged regularly, i.e. always or frequently, at these destination points. At these destination points, the program can then assume that battery service is possible at these positions so that these destination points, too, are available as battery service stations.

If necessary, the driver can perform an evaluation of the various existing destination points in the sense of ranking so that the method can take into consideration this typical ranking in an automatic selection of destination points. This ranking can be stored, for example, in weekday- or daytime-dependent profiles. This is done in step 6 during the reading-in of preconfigured destination points.

Additionally, at step 7 a determination of possible destination points is also performed in a particular embodiment, wherein firstly, for example, battery service stations known from a digital map can be determined as destination points within a certain perimeter around the current location of the vehicle. In step 7, a check is done, of possible destination points, which of the preconfigured destination points are located within a predetermined range area around the vehicle. From this, a list of all possible destination points is generated which is then forwarded to the automatic destination point selection step 8. If the list of possible destination points contains the destination point predetermined by the user as preferred destination point, it can be selected without further interaction and confirmation by the driver and specified automatically as destination point.

If this destination point is not contained in the list of possible destination points but a number of destination points identified as preferred are contained, the automatic destination point selection step 8 can select the destination point farthest at the top in the listing, i.e. the ranking, and suggest it to the user for destination point confirmation in a menu enquiry step 9. In the menu enquiry, the option is preferably given simply to select other preferred destination points. After a confirmation or selection of the destination point, specification of the destination point can also take place here. In this case, a partially automatic destination point selection is possible.

If there is also no destination point identified as preferred, an automatic destination point selection is not possible. In this case, a menu enquiry step 10 with a destination point input takes place wherein, if necessary, all destination points can be specified for the user in the menu enquiry step 10. It is also possible that the user generates a completely new destination point.

As a result, specification step 11 of the destination point or, if it appears to be meaningful and/or is desired by the user, of a number of destination points then follows.

This destination point selection can take place in the same manner if the vehicle exceeds the accessibility threshold for a destination point and then a new destination point has to be selected mandatorily. For this purpose, all destination points around the new location of the vehicle are found and the specification of the destination point described above is carried out again.

It should be pointed out that the selection of destination points takes place automatically or semi-automatically so that the user, in contrast to an elaborate input in the case of navigation, only needs to select various destinations from a list which, in the case of typical user behaviors, are also suitably preconfigured. Such a method is much simpler to carry out than the elaborate route planning known in each case from the prior art.

Figure 3:
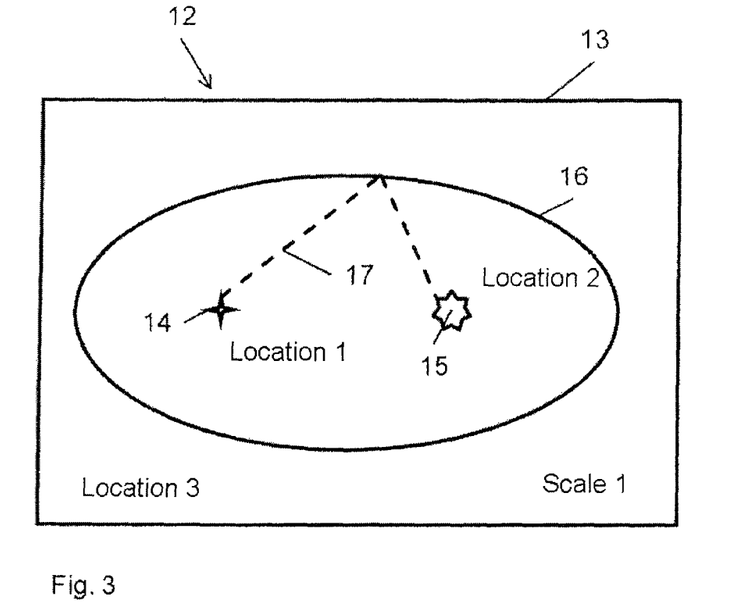
FIG. 3 shows a possible display of the accessibility on a display in a first state.

FIG. 3 shows a first representation of a display 12 according to the invention of the operating range on a display unit 13, designed, for example, as touch display, which can then also be used as a user interface. The displays 12 can be a digital map illustration or a cursory, schematized map depending on the information available to the display 12.

Figure 4:
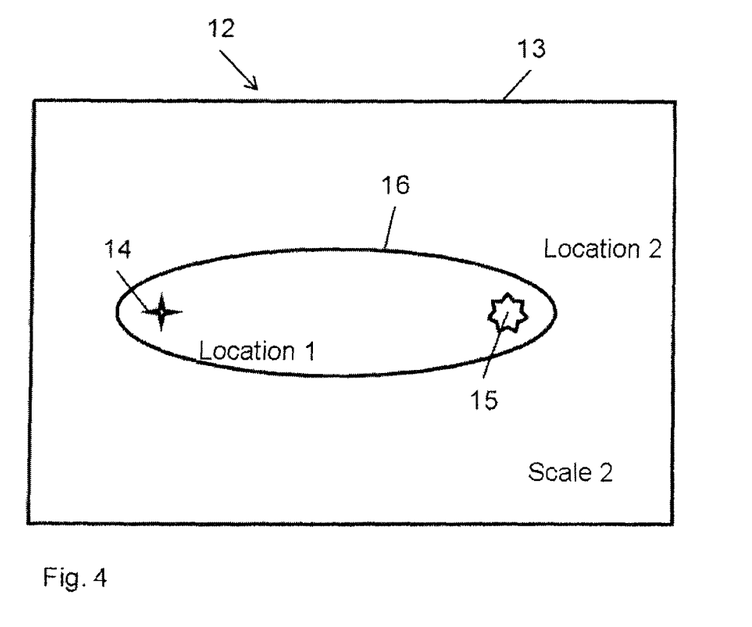
FIG. 4 shows a possible display of the accessibility on a display in a second state.
Figure 5:
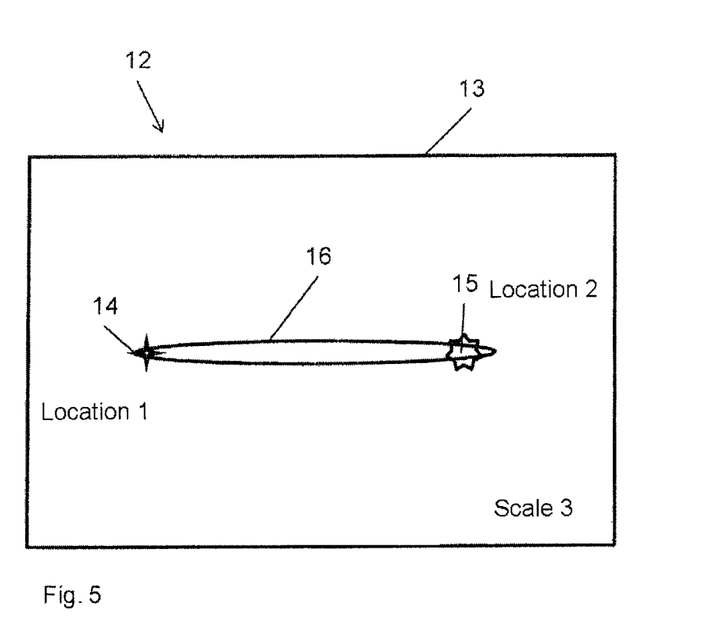
FIG. 5 shows a possible display of the accessibility on a display in a third state.

In the example according to FIGS. 3, 4 and 5 shown, the map illustration is in each case represented by the information "scale 1, 2 or 3, respectively" and the locations "location 1", "location 2" and/or "location 3". In a real representation, it is naturally desirable to insert as much information as possible, especially a road illustration appropriate to the respective scale, so that the driver receives, if possible, accurate information with respect to the operating range.

In the map, the starting point 14, corresponding to the current location of the vehicle, is reproduced by a four-pointed star and the destination point 15, as the selected battery service station, as seven-pointed star. The operating range determined as described above is represented by ellipse 16 within which the starting point 14 and the destination point 15 are located. The edge of the ellipse 16 represents the accessibility threshold which cannot be exceeded starting from the starting point 14, in order to still reach the destination point. An exemplary traveling route 17 is drawn in as dashed line. In this context, the driver—starting from the starting point 14—can drive up to the edge of the ellipse 16 at the accessibility threshold and must continue from there to the destination point 15 so that he reaches the destination point 15 with the energy currently still present in the battery. According to the invention, the destination point 15 represents a battery service station in which the battery can be charged or exchanged. The total length of the dashed line (traveling route 17) thus represents the maximum operating range. However, the traveling route 17 is only shown for explanation in the illustration of FIG. 3 and is not or at least not always shown on a display 12 according to the invention.

It should be pointed out that FIGS. 3, 4, 5 and 6 only form a diagrammatic representation of the principle of operation and are not illustrations geometrically true to scale.

FIG. 4 represents a later time of the traveling route shown according to FIG. 3 on a larger scale 2. At this time, a part of the energy still present at the time according to FIG. 3 is already consumed so that the ellipse 16 with the accessibility threshold is now narrower. This means that the driver must drive on a more direct route from the current location as starting point 14 to the destination point 15 in order to still reach this destination point. Location 2 which, according to FIG. 3, was still within the operating range, can now no longer be reached. Location 3 is no longer drawn in at all in this map illustration with "scale 2", just as little as a possible traveling route 17, which was still drawn in FIG. 3 for explaining the significance of the ellipse 16 as accessibility threshold.

In the representation according to FIG. 5, the driver of the vehicle has driven on further and has additionally consumed much power due to extensive air conditioning in the meantime. In the meantime, the ellipse 16 has almost shrunk to a straight line between the starting point 14 and the destination point 15. This means that the driver must now drive on as direct a route as possible from the current location (starting point 14) to the specified destination point 15 in order there to charge or exchange the battery of his motor vehicle. In this illustration, "scale 3" is enlarged further compared with FIG. 4.

Figure 6:
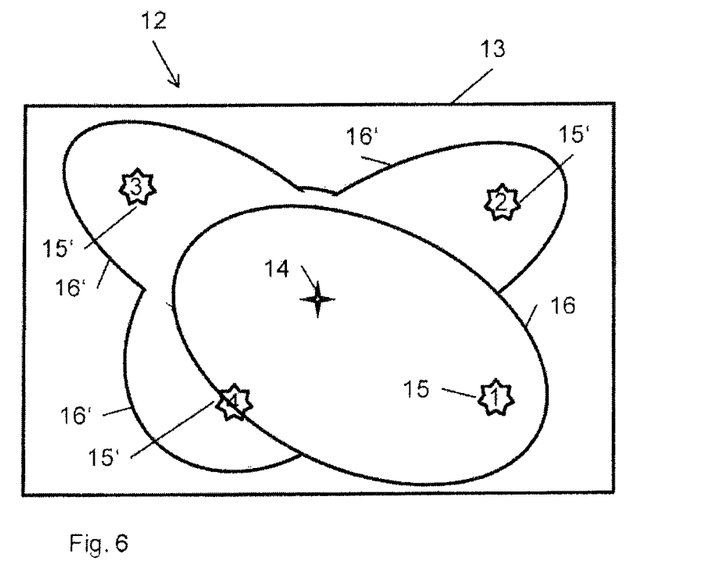

FIG. 6 shows the illustration of the operating range on a display unit 13 of display 12 in which a number of destination points 15 are selected, namely the preferred destination point 15 designated as "1" and the destination points 15' designated as destination points "2", "3" and "4". The accessibility threshold was determined as ellipse 16 or 16', respectively, at each destination point 15 or 15', respectively, and drawn in the display 13. In this context, the ellipse 16 of the preferred destination point 15 is shown completely in order to indicate to the driver that he has the operating range shown for his preferred destination point 15. For the remaining destination points 15', a comparable range calculation was carried out wherein the resultant ellipses were combined to form an overall ellipse 16' which represents the possible overall operating range in the selection of a respective destination point 15'. For the sake of clarity, the locations and the scale of the map illustration on the display 13 have not been shown in FIG. 6.

FIG. 7 diagrammatically shows the display device 18 according to the invention with a display unit 13 for displaying the operating range of an electric drive vehicle, where the starting point 14, the destination point 15 and the ellipse 16 can be recognized diagrammatically on the display unit 13. The display unit 13 is connected to a computing unit 19 with data memory and—via the computing unit 19—to a user interface 20 and a sensor unit 21 via a vehicle bus 22. According to the invention, the computing unit 19 is configured to perform the method described above.

Thus, a display device 18 and a method executed on it are available in which the operating range of an electric drive vehicle can be presented dynamically and in a manner clear to the driver without input of destination.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for displaying (12) an operating range of an electric drive vehicle, the method comprising:
   determining battery energy in the vehicle with a sensor;
   deriving from the determined battery energy a maximum operating range of the vehicle;
   selecting, as respective destination points (15, 15') for determining the maximum operating range (16), a plurality of different battery service stations, wherein all selected destination points (15, 15') for determining the maximum operating range (16) are battery service stations;
   determining an accessibility threshold (16) using a starting point (14) as a basis, beyond which the vehicle can no longer reach at least one of the plurality of destination points (15, 15') with the derived battery energy; and
   displaying, by a display unit (13), the determined accessibility threshold (16) as an operating range in a map illustration,
   wherein the determination of the accessibility threshold (16) uses a current location of the vehicle as the starting point (14) and the current battery energy of the vehicle, the current location and the current battery energy of the vehicle being updated at predeterminable intervals while the vehicle is traveling.

2. The method as claimed in claim 1, wherein at least one destination point (15) is automatically selected in accordance with predetermined criteria.

3. The method as claimed in claim 1, wherein at least one destination point (15) is updatable.

4. The method as claimed in claim 1, wherein a number of the different destination points (15, 15') are selected and the operating range (16) is displayed as combined operating range.

5. The method as claimed in claim 1, wherein the display of the operating range (16) in a map illustration takes place by presentation of at least one destination point (15) and the starting point (14), and an area surrounding the at least one destination point (15) and the starting point (14), the boundary of this area being defined by the operating range (16) from the starting point (14) to the at least one destination point (15).

6. The method as claimed in claim 1, wherein at least one destination point (15) and the starting point (14) are shown as focal points of an ellipse (16) the edge of the ellipse being defined by the total length of a group of connecting lines, corresponding to the current operating range (16), from one focal point (14) to a point on the edge of the ellipse (16), and from this point on the edge of the ellipse (16) to the other focal point (15).

7. The method as claimed in claim 1, further comprising taking into consideration the plural destination points (15, 15'), and, for each destination point (15, 15'), taking into consideration the respectively current starting point (14), the respective accessibility threshold (16, 16') being determined and shown as combined accessibility threshold (16, 16').

8. The method as claimed in claim 1, wherein in determining the maximum operating range (16), information relating to driving technique, vehicle power consumption management and/or information about topology in the surrounding environment is taken into consideration.

9. The method as claimed in claim 1, wherein vehicle sensors are used in determining the maximum operating range (16).

10. A display device comprising:
    a display unit (13) for displaying (12) the operating range of an electric drive vehicle;
    a computing unit (19) with data memory; and
    a user interface (20) and a sensor unit (21) configured to determine the position of the vehicle,
    wherein the computing unit (19) is configured to perform the method as claimed in claim 1.

11. The display device as claimed in claim 10, wherein the sensor unit (21) has an angle transducer, a wheel sensor, a speed sensor, an acceleration sensor, an inclination sensor, a height sensor and/or a position finding sensor.

12. A non-transitory computer-readable medium storing program code that, when executed by a computing unit (19) of a display device (18), causes the display device (18) to display the operating range (16; 16') of an electric drive vehicle according to the method as claimed in claim 1.

* * * * *